Patented Feb. 28, 1933

1,899,054

UNITED STATES PATENT OFFICE

WILLETT C. PIERSON, OF EAST ORANGE, NEW JERSEY, ASSIGNOR TO LEAGUM CORPORATION OF DELAWARE, OF NEW YORK, N. Y., A CORPORATION OF DELAWARE

LACQUER-BASE, LACQUER AND METHOD OF MAKING SAME

No Drawing. Application filed May 4, 1928. Serial No. 275,261.

This invention relates to a lacquer-base, the lacquer formed therefrom, and to the method of making the same.

The invention provides a lacquer-base which is made largely from inexpensive ingredients, and which may be produced at low cost, and hence provides a low-cost lacquer. Leather scrap is used in large part.

The invention further provides a lacquer, which, when applied as a coating, will stand considerable heat without its coating properties being materially deteriorated. It provides a practical substitute for higher-cost lacquers having a condensation-product base.

The invention further provides a novel process of forming my lacquer-base.

According to my invention, I take leather, and preferably scrap or waste leather because of its cheapness, and first soften or plump it by soaking it, the softening or plumping being facilitated by adding an acid or alkali to the soaking water to form a weak acid or alkali solution. Sulphuric acid I prefer for acidifying, and urea for alkalizing. This plumping also probably results in partially stripping tannic acid or other tanning agents from tanned leather.

After the leather has been softened, it is brought to a gummy state by heating. Preferably the heating is carried on at a temperature which will not cause disintegration of the leather. Good results may be obtained by heating the leather (immersed in water sufficient to cover it) at temperatures between 150-200° F. When properly heated, the gummy leather should pull out in long thin threads, preserving its fibrous character.

As thus far described, the preparation of the scrap material is the same as that described in my application, Serial No. 241,728, relating to a thermo-plastic molding composition.

After heating, the water or solution standing in the kettle is run off.

For maintaining the plasticity, uniformity and flexibility of the lacquer, particularly in the form of a coating, I add urea, ethylene glycol and phenol. The urea has the property of thinning the gummy leather somewhat, the ethylene glycol acts in the manner of a plasticizer, and the phenol adds to the flexibility of the lacquer coating, particularly under conditions where the lacquer coating is subject to heating.

The preferred proportions are as follows: 75 grams of the gummy leather as described above, 6 grams urea, 15 grams ethylene glycol, and 10 grams phenol.

The mixing is preferably carried out in a steam-jacketed mixer, the urea first being added, then the ethylene glycol, then the phenol. All of the ingredients may, however, be added at once.

The intimate mixture of the ingredients may be completed on rolls, such as used in mixing rubber compounds, with advantage.

There may be considerable variation in the proportions of the ingredients given above without loss of the properties of my lacquer-base.

The lacquer-base as prepared above, is prepared for use as a lacquer by mixing suitable solvents, such for example as a mixture of acetone and ethyl acetate, the preferred proportions being about two portions of ethyl acetate to one of acetone. Benzol or solvent naphtha may also be used as solvents, they also being incorporated with the first mentioned solvents. In fact any suitable or known solvent or mixtures of solvents may be used.

The invention may receive other embodiments, and may be carried out by other modes of procedure than those herein specifically given.

Materials of the same chemical nature and related constitution may be substituted for the phenol, ethylene glycol and urea.

What is claimed is:

1. A lacquer-base comprising gummy leather, urea, ethylene glycol and phenol.

2. A lacquer-base comprising gummy leather, urea, ethylene glycol and phenol, said materials being present in approximately the proportion of the weights: 75 grams gummy leather, 6 grams urea, 15 grams ethylene glycol, and 10 grams phenol.

3. A lacquer comprising a base according to claim 1 and a solvent in which it is dissolved.

4. A lacquer comprising a base according to claim 2 and a solvent in which it is dissolved.

5. The method of preparing a lacquer-base comprising heating leather in water to a temperature of 150–200° F. until it becomes of a gummy fibrous character; and mixing with said gummy leather, urea, ethylene glycol and phenol.

In witness whereof, I have hereunto signed my name.

WILLETT C. PIERSON.